US010437049B2

(12) United States Patent
Cassarly

(10) Patent No.: US 10,437,049 B2
(45) Date of Patent: Oct. 8, 2019

(54) OPTICAL DESIGN USING FREEFORM TAILORING

(71) Applicant: Synopsys, Inc., Mountain View, CA (US)

(72) Inventor: William J. Cassarly, Wooster, OH (US)

(73) Assignee: Synopsys, Inc., Mountain View, CA (US)

(*) Notice: Subject to any disclaimer, the term of this patent is extended or adjusted under 35 U.S.C. 154(b) by 0 days.

(21) Appl. No.: 16/180,265

(22) Filed: Nov. 5, 2018

(65) Prior Publication Data

US 2019/0072762 A1 Mar. 7, 2019

Related U.S. Application Data

(62) Division of application No. 14/519,418, filed on Oct. 21, 2014, now Pat. No. 10,151,921.

(60) Provisional application No. 61/899,811, filed on Nov. 4, 2013.

(51) Int. Cl.
*G06F 17/50* (2006.01)
*G02B 27/00* (2006.01)
*F21V 7/04* (2006.01)

(52) U.S. Cl.
CPC ........... *G02B 27/0012* (2013.01); *F21V 7/04* (2013.01); *F21V 7/048* (2013.01)

(58) Field of Classification Search
CPC .......... G06F 17/50; F21S 11/00; F21S 11/007
USPC ........................... 703/1; 359/597; 362/1, 347
See application file for complete search history.

(56) References Cited

U.S. PATENT DOCUMENTS

| | | | | |
|---|---|---|---|---|
| 7,178,922 B2* | 2/2007 | Sekiguchi | ........... | G02B 27/0927 348/E5.139 |
| 7,251,077 B2 | 7/2007 | Holmes et al. | | |
| 10,101,000 B2* | 10/2018 | Kieslinger | ............... | B60Q 1/04 |
| 2012/0039076 A1 | 2/2012 | Chuang | | |
| 2015/0241024 A1* | 8/2015 | Smith | ..................... | F21K 9/233 362/296.07 |

OTHER PUBLICATIONS

United States Office Action, U.S. Appl. No. 14/519,418, filed Apr. 18, 2018, 8 pages.
Canavesi, C. et al., "Target Flux Estimation by Calculating Intersections Between Neighboring Conic Reflector Patches" Optics Letters, Dec. 1, 2013, pp. 5012-5015, vol. 38, No. 23.
Oliker, V. I., "Mathematical Aspects of Design of Beam Shaping Surfaces in Geometrical Optics," Trends in Nonlinear Analysis, Kirkilionis, M. et al. (eds.), 2002, pp. 191-224.
United States Office Action, U.S. Appl. No. 14/519,418, dated Apr. 18, 2018, 8 pages.

* cited by examiner

*Primary Examiner* — Andy Ho
(74) *Attorney, Agent, or Firm* — Fenwick & West LLP

(57) ABSTRACT

An optical design system is used to design a light shaping element that directs light from a specified source to a specified light distribution. The process includes designing related faceted optical devices (reflective or refractive) such that light from a common source point is distributed across multiple target points.

20 Claims, 13 Drawing Sheets

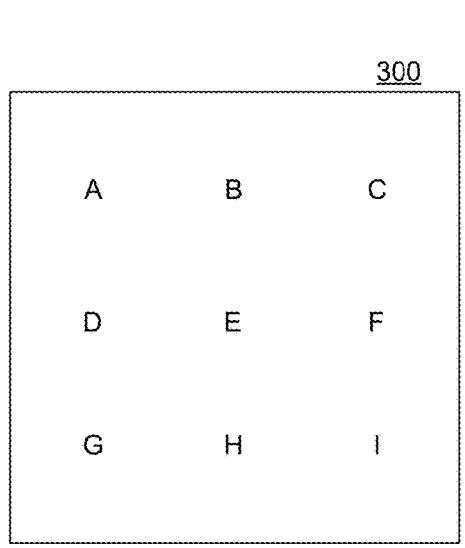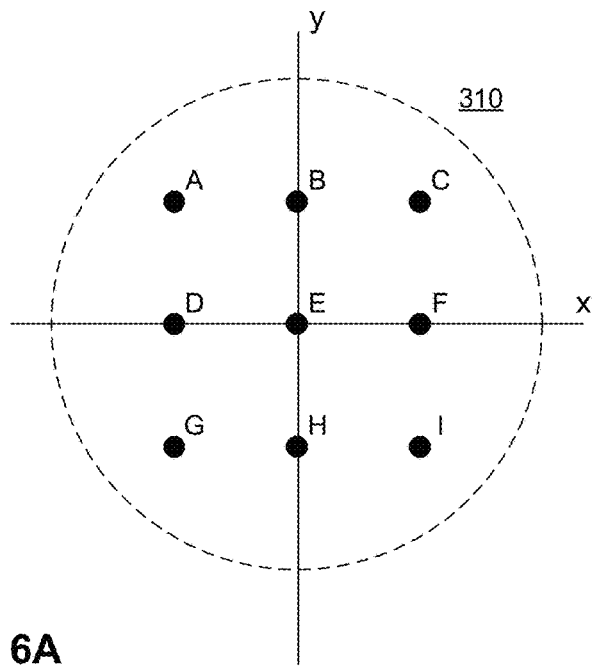
FIG. 6A
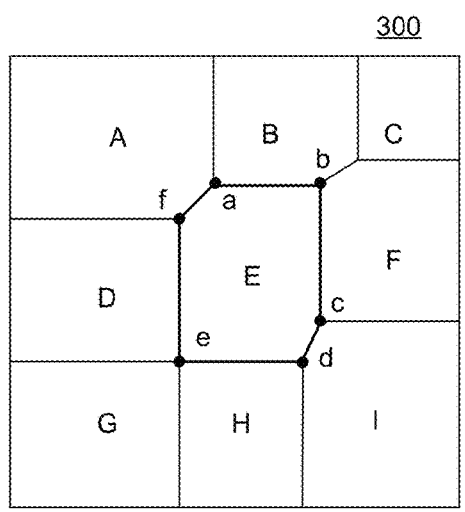
FIG. 6B
a = A,B,E
b = B,F,E
c = F,I,E
d = I,H,E
e = H,D,E
f = D,A,E
FIG. 6C

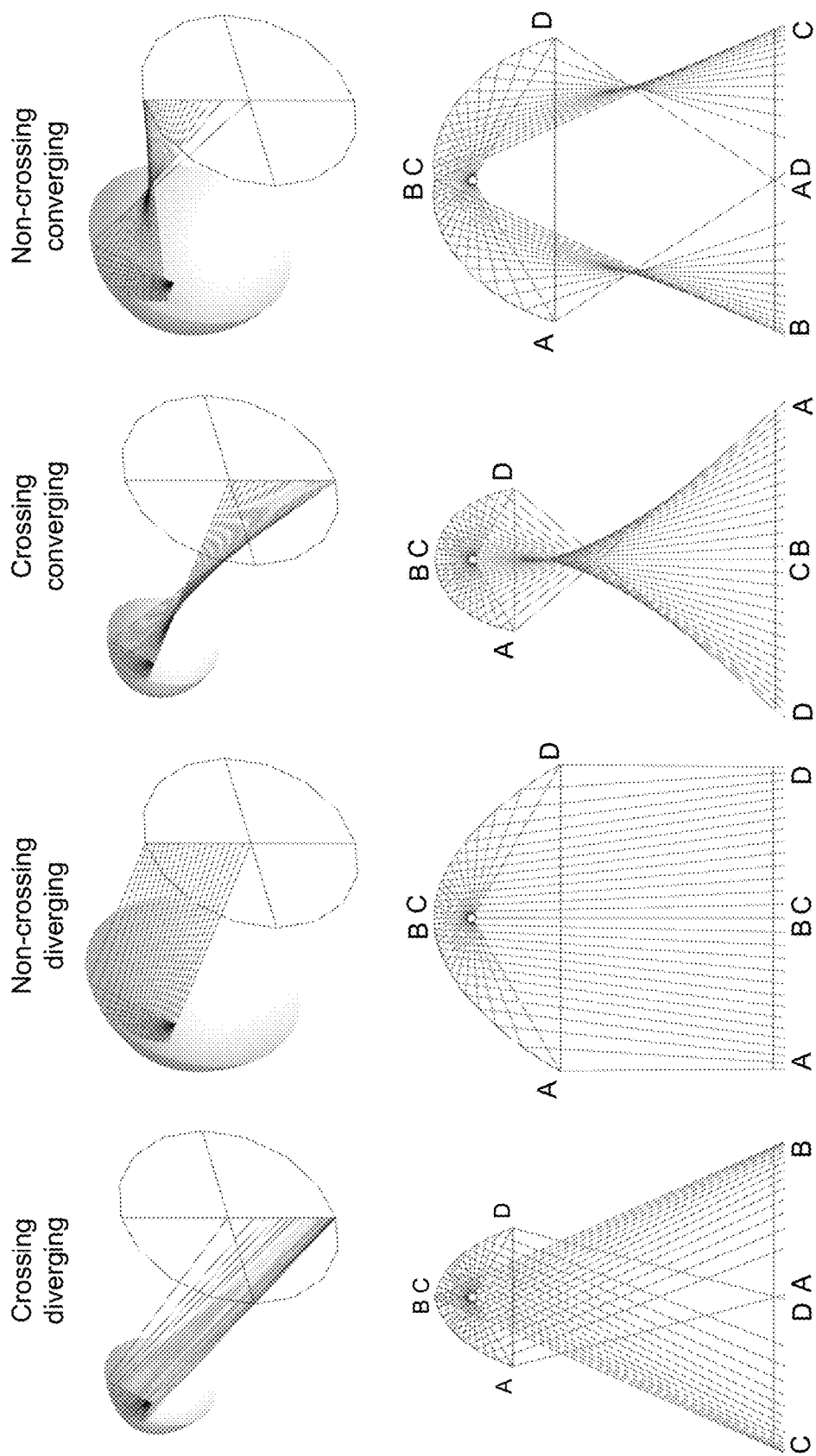

1210
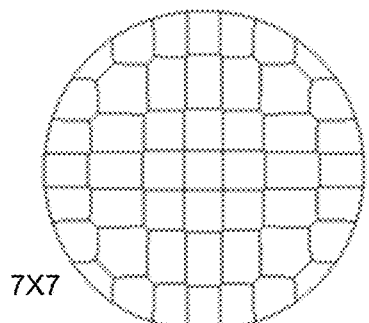
7X7
1220
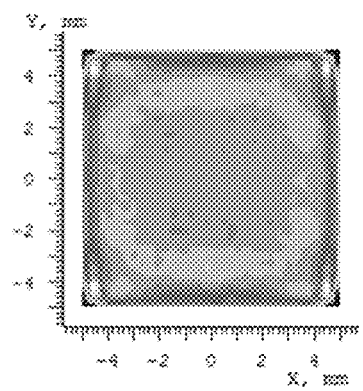
FIG. 12A
1230
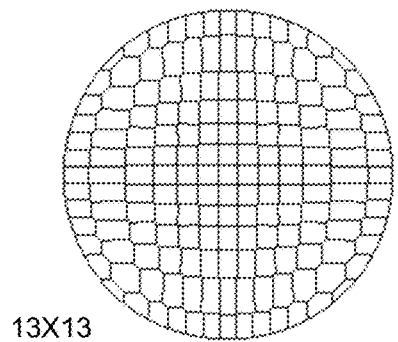
13X13
1240
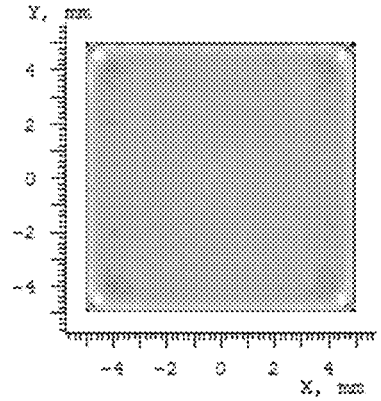
FIG. 12B
1250
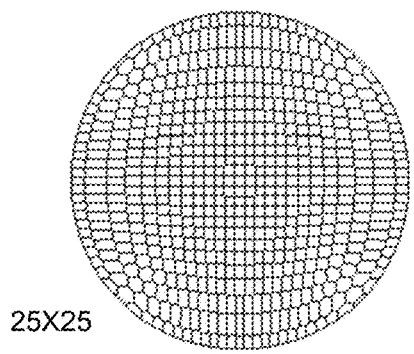
25X25
1260
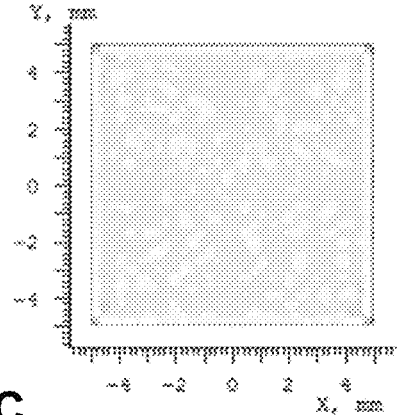
FIG. 12C

OPTICAL DESIGN USING FREEFORM TAILORING

CROSS-REFERENCE TO RELATED APPLICATIONS

This application is a divisional of U.S. application Ser. No. 14/519,418, filed Oct. 21, 2014, which application claims the benefit of U.S. Provisional Application No. 61/899,811, filed Nov. 4, 2013, all of which are incorporated by reference in their entirety.

FIELD OF DISCLOSURE

This disclosure relates to the field of optical design systems generally, and specifically to optical design systems for designing optical freeform surfaces.

DESCRIPTION OF THE RELATED ART

Presently, optical computer aided design systems may tailor a surface (e.g., a reflective or refractive element) to direct light from a particular source to a particular target, with the goal to achieve a particular light distribution at the target. For many applications, including lighting applications, this can be a fairly unconstrained design problem. These tailored surfaces could be, for example, a patchwork of different reflectors or refractors that together in the aggregate provide the desired light distribution at the target. They could also be a continuous surface. However, using traditional methods, tailoring a surface to provide the desired light distribution can be complicated, computationally intensive, and time-consuming. In a typical design process, the design may be iterated many times, which further aggravates the complexity and time requirement.

SUMMARY

An optical design system is used to design a light shaping element that directs light from a specified source to a specified light distribution. The process includes designing a faceted optical element (which could be reflective or refractive) such that light from a common source point is distributed across multiple target points. The faceted design could be the final design, or it could be used as an intermediate step in designing the final design, which could be a non-faceted design.

In one embodiment, the optical design system accesses a first faceted optical design having $N_1$ facets. Each facet directs light from a common source point to a target point for that facet. For reflective designs, the facets are typically ellipsoids. For refractive designs, the facets are typically Cartesian ovals. The common source point and target points are based on the design problem. For example, the common source point might be a simplification of the specified source and the set of target points might be a sampling of the specified light distribution. The optical design system improves the first faceted optical design by adjusting areas of the $N_1$ facets, based on distributing light among the target points according to a first discrete target distribution that is based on the specified light distribution.

Once the $N_1$ facet design meets the discrete target distribution, if it is not sufficient to meet the overall requirements, the number of facets is increased. In one approach, the optical design system constructs a source-target mapping based on the $N_1$ facets, the $N_1$ target points and the distribution of light among the $N_1$ target points. The optical design system resamples the source-target mapping at $N_2$ samples, $N_2 > N_1$. It then creates a second faceted design having $N_2$ facets, each facet directing light from the common source point to a target point for that facet, where the target points are based on the specified light distribution. The optical design system improves the second faceted design by adjusting areas of the $N_2$ facets, based on distributing light among the target points according to a second discrete target distribution based on the specified light distribution. This can continue until the faceted design has enough facets to meet the design goals.

In another aspect, an optical design system determines the amount of light captured by the facets. The optical design system determines vertices of a facet by determining the intersection point of the facet with two neighboring facets. It then determines a boundary of the facet based on the vertices. The optical design system estimates the flux intercepted by the facet based on the boundary of the facet.

Other aspects include methods, processes, devices, systems, applications, components, improvements and other technology related to those described above.

BRIEF DESCRIPTION OF DRAWINGS

FIGS. 6A-C illustrate determining a boundary for a faceted reflector, according to an embodiment.

FIGS. 8A-D illustrate facet to target point mapping for different reflector geometries.

FIGS. 12A-C illustrate design of an example optical element, progressing from a 7×7 faceted design to a 25×25 faceted design.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein.

Reference will now be made in detail to several embodiments, examples of which are illustrated in the accompanying figures. It is noted that wherever practicable similar or like reference numbers may be used in the figures and may indicate similar or like functionality.

Figure 1:
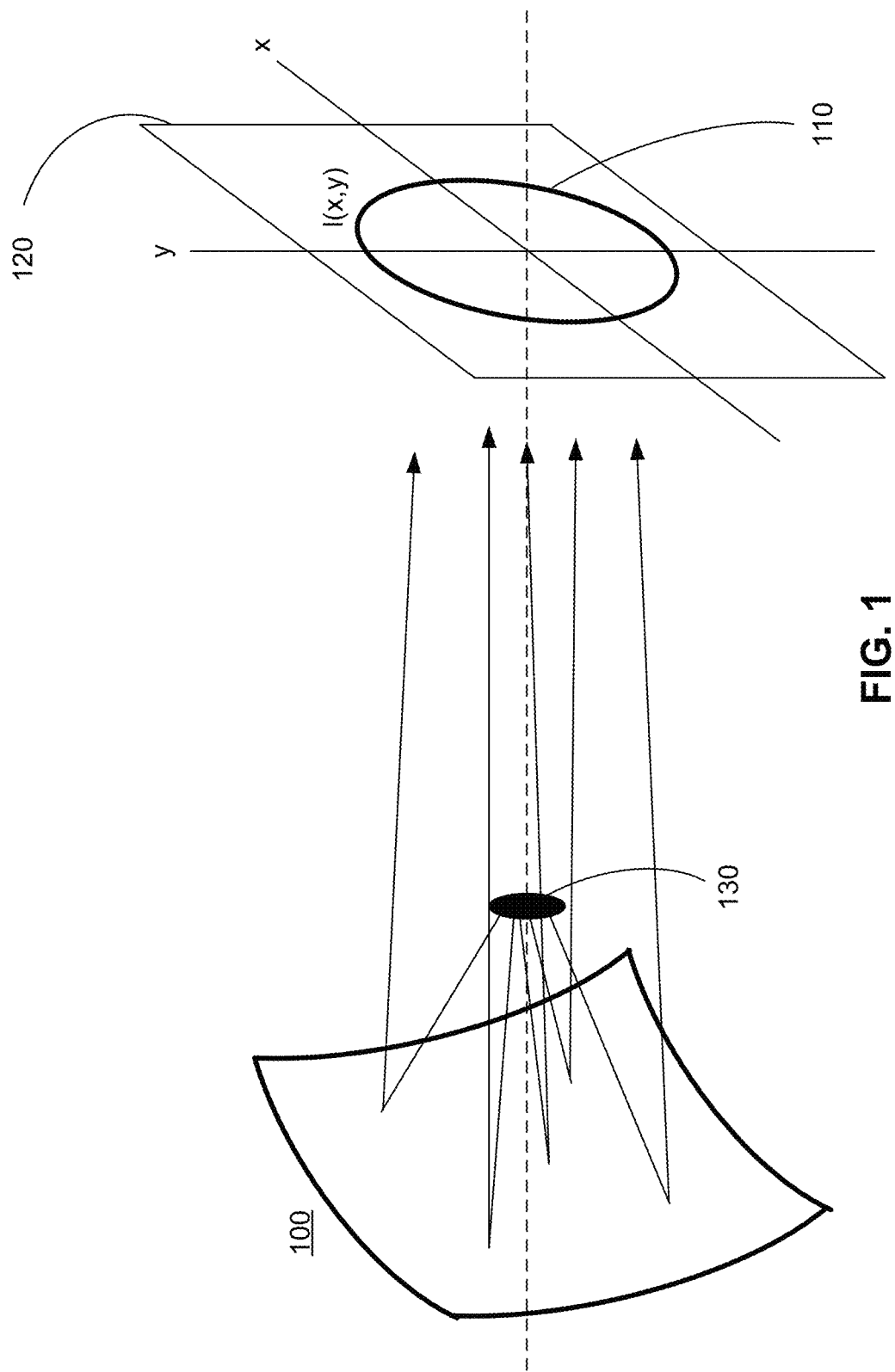
FIG. 1 illustrates the design problem of designing a reflector for producing a specified light distribution I(x,y) on a target area from a specified light source, according to an embodiment.

FIG. 1 illustrates the design problem of designing a reflector 100 for producing a specified light distribution I(x,y) on a target area 120 from a specified light source 130, according to an embodiment. Typically, in this type of design problem, the light source 130 and desired light distribution I(x,y) are specified, for example by customer requirements. The designer is faced with designing a reflector 100 that directs light from the source 130 according to the desired light distribution I(x,y).

The light source 130 could be any type of source: incandescent, fluorescent, LED, combinations of the foregoing, etc. It could also have different geometries: point source, collection of point sources, extended source, combinations of these, etc. The desired light distribution I(x,y) could also take on a variety of distributions: uniform intensity, light focused in certain areas, certain hot spots desired, certain hot spots to be avoided, etc. The light distribution I(x,y) could be continuous (i.e., light distributed continuously over the target area) or it could be discrete (i.e., light focused at specific points in the target area).

The reflector 100 could also take on a variety of shapes. In FIG. 1, the reflector is a continuous design (i.e., not faceted and without cusps in the surface). If there are many degrees of freedom to the shape of the reflector 100, then the design problem becomes almost a freeform design problem and may be referred to as freeform tailoring. The design problem typically is also subject to specifications beyond just the optical distribution requirement. There may be additional requirements on size, weight, cost, durability, manufacturability, etc. The final design of the reflector 100 could be various shapes. For example, it could be faceted. In that case, the facets in the aggregate achieve the desired light distribution I(x,y).

In the example of FIG. 1, the source 130 is an extended source having an oval shape. The desired light distribution 110 is uniform over the circular area shown. The optical design is a continuous reflector 100 with apex at a certain position along the optical axis.

Figures 2, 2A:
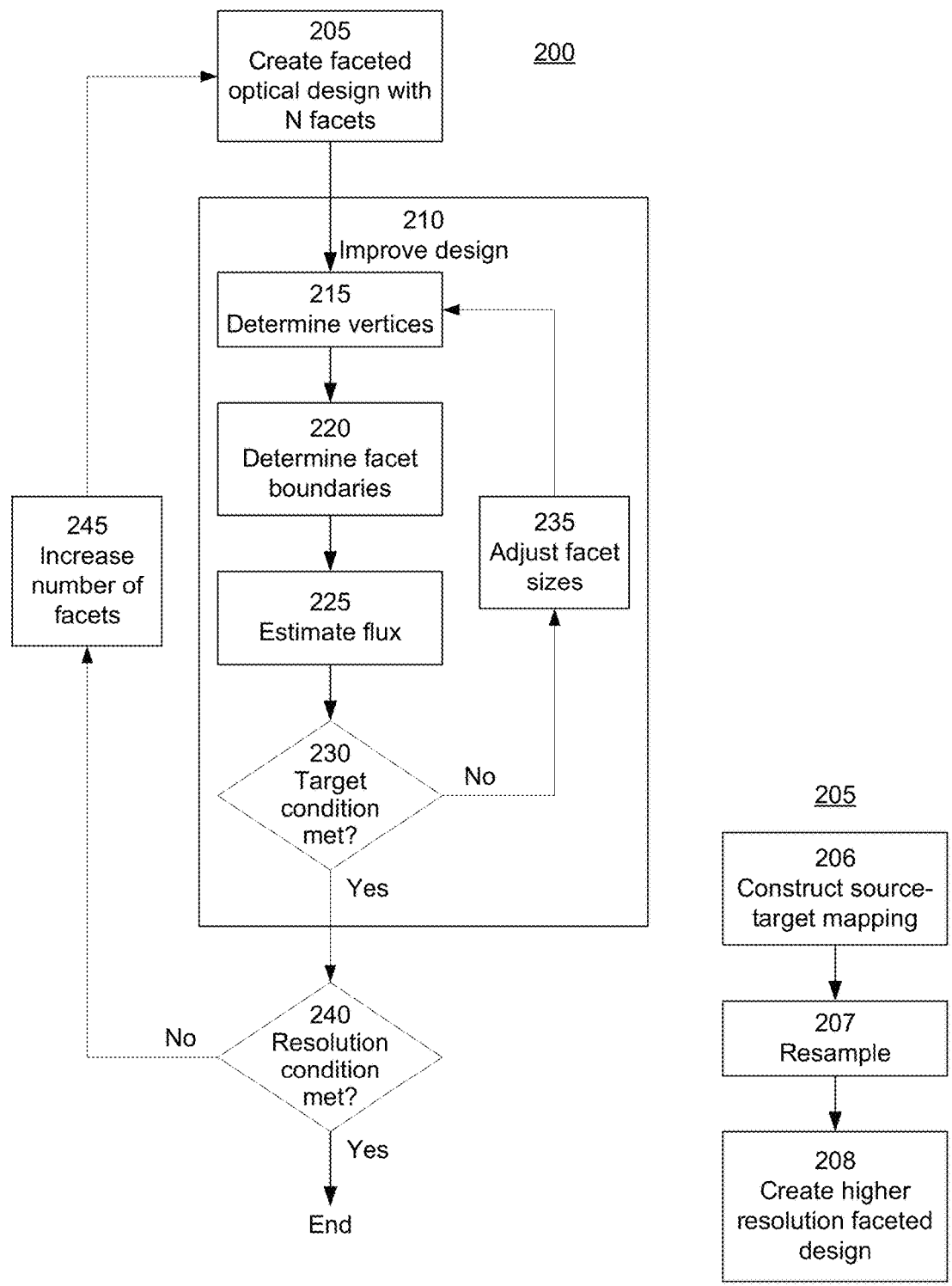
FIG. 2 is a flowchart illustrating an optical design process for freeform tailoring according to an embodiment.
FIG. 2A is a flowchart illustrating a process for source-target mapping and resampling, according to an embodiment.
Figure 10:
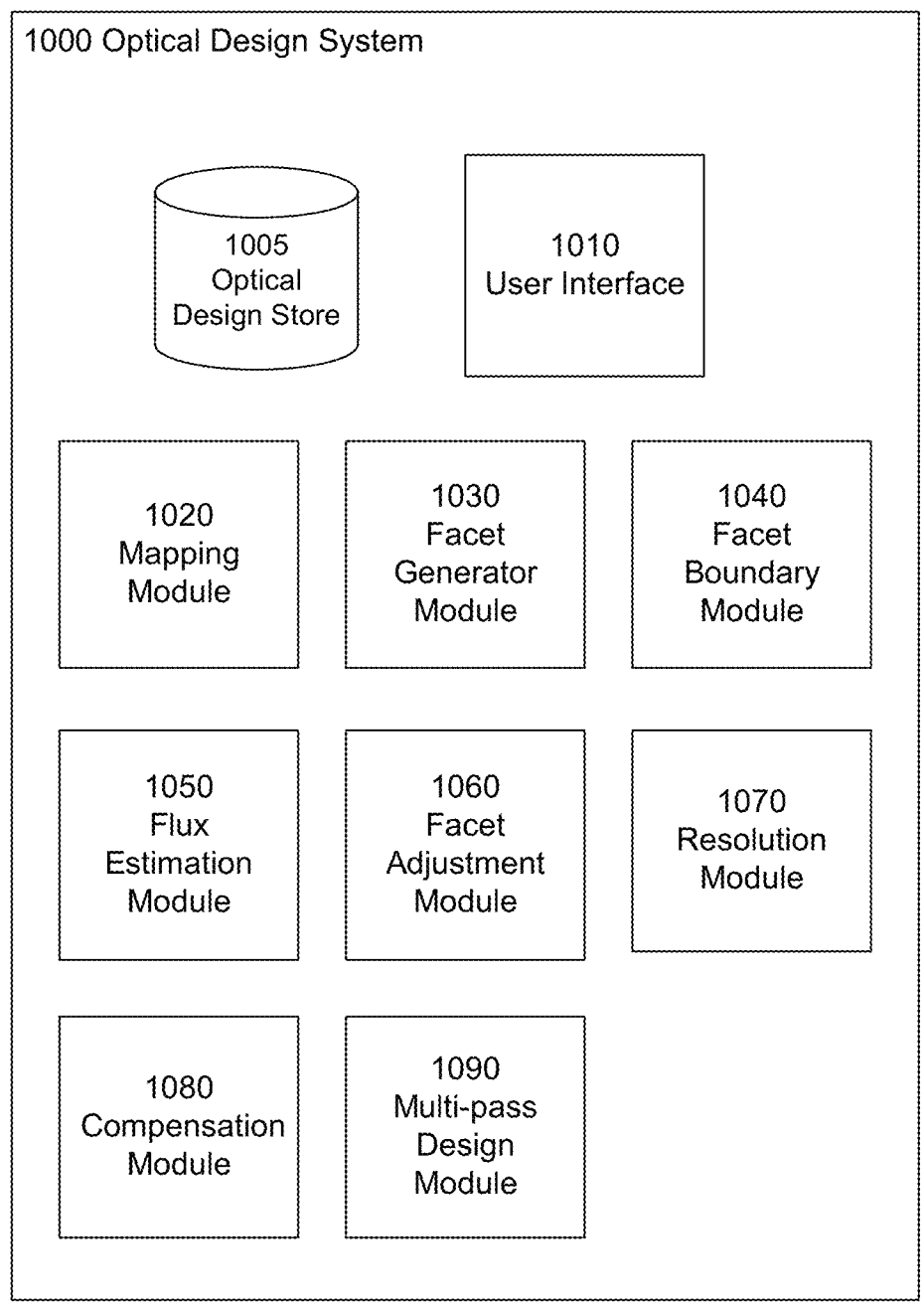
FIG. 10 is a high-level block diagram illustrating an embodiment of an optical design system.

FIG. 2 is a flowchart illustrating an optical design process 200 for freeform tailoring according to an embodiment. In one embodiment, the process of FIG. 2 is performed by an optical design system (e.g., as shown in FIG. 10). Other entities may perform some or all of the steps of the process in other embodiments. Likewise, embodiments may include different and/or additional steps, or perform the steps in different orders.

In the example of FIG. 2, at some point during the design process, the optical design system accesses or creates 205 a faceted optical design with N facets. The optical design system then improves 210 the design. In one approach, the design is iteratively optimized relative to a target condition for the N facet design. This target condition typically will be based on the overall design problem. In each iteration, the sizes of the facets are adjusted 235 until the target condition is met 230. The optimized N facet design is then evaluated to determine whether a resolution condition 240 is met. In other words, is the number of facets sufficient to achieve the resolution condition? If not, then the number of facets is increased 245 and the new design with more facets is optimized 210. This is repeated until an acceptable design is reached.

In more detail, in one embodiment of FIG. 2, given the design problem, the optical design system creates 205 a faceted optical design with N facets. The optical design system 205 creates the faceted optical design using one or more initial design parameters. These initial design parameters describe characteristics of the desired optical design (e.g., whether the design is reflective or refractive, the specified light source, the specified light distribution, target sampling, sampling factor, resolution (e.g., the initial number of facets $N_1$)).

Figure 3:
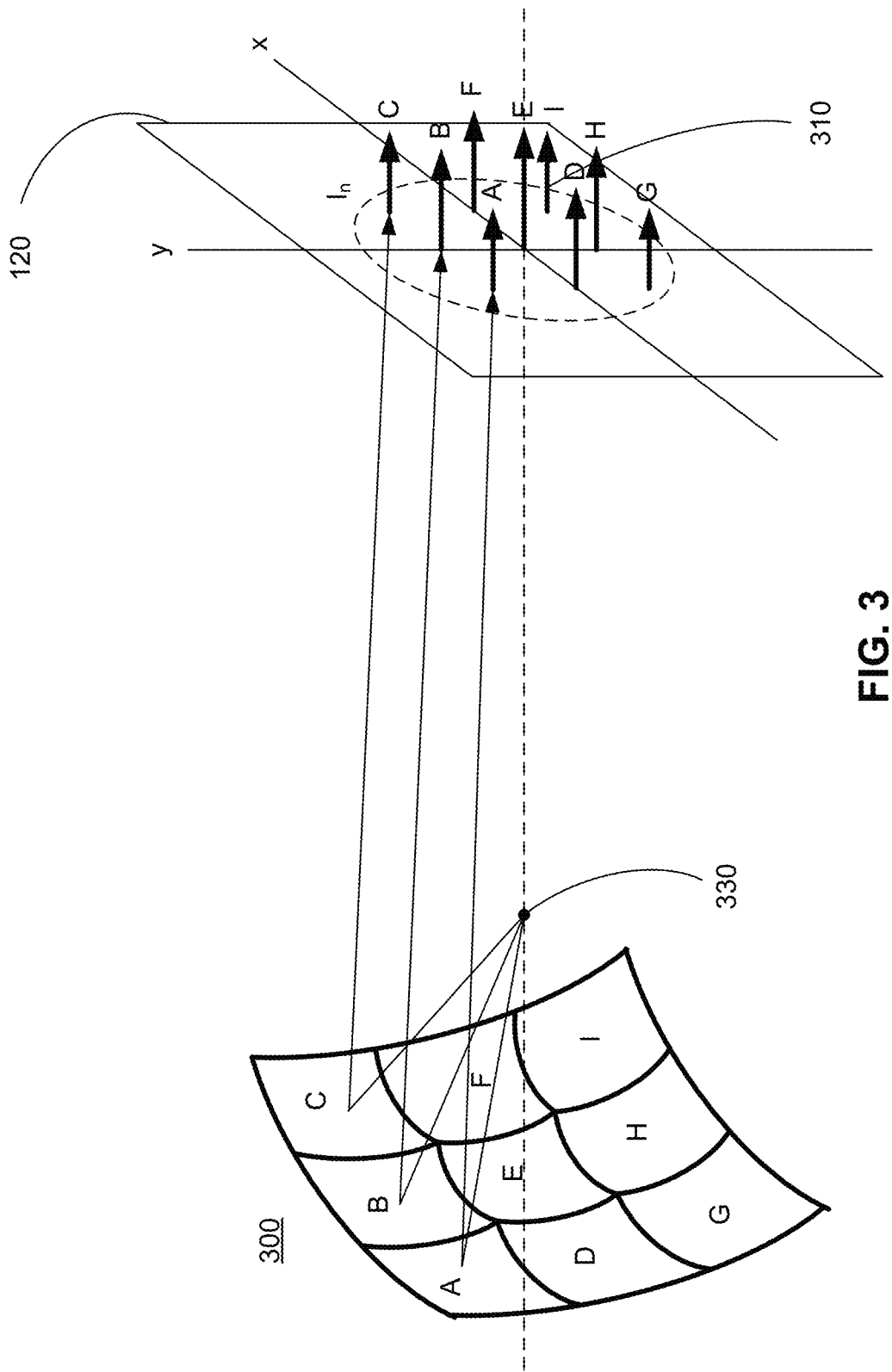
FIG. 3 illustrates a faceted reflector and a corresponding 3×3 discrete target distribution, according to an embodiment.

The faceted optical design is created 205 based on a derivative design problem. The faceted optical design is not designed to direct light from the specified light source to the specified light distribution I(x,y), as shown in FIG. 1. Rather, in the derivative design problem shown in FIG. 3, the specified light source is represented by a source point 330 and the specified light distribution I(x,y) is represented by a discrete target distribution L 310. The discrete target distribution is shown as nine heavy arrows in FIG. 3. Each arrow represents the desired light at that discrete location. The originally specified light distribution is shown by the dashed circle, for convenience. The optical design system generates the discrete target distribution based on the specified light distribution and design parameters such as target sampling, sampling factor and/or resolution. In FIG. 3, the faceted optical design 300 has nine facets A-I.

The faceted design 300 operates so that each facet 300A-I directs light from the common source point 330 to a corresponding target point according to the discrete target distribution L. For example, all rays that leave common source point 330 and strike facet 300A are directed to target point 310A. Similarly, all rays that leave common source point 330 and strike facet 300B are directed to target point 310B. And so on for all of the facets 300A-I and corresponding target points 310A-I. In this way, light from source point 330 is directed to the target points 310A-I.

How much light is directed to each target point depends on the size of the corresponding facet. For example, the amount of light received at target point 310A depends on how much flux is collected by facet 300A. As facet 300A increases in size and collects more flux, then more light will be concentrated at target point 310A. Thus, the actual light distribution can be matched to the discrete target distribution $I_n$ by varying the sizes of the different facets.

Each facet can be defined by the common source point, the corresponding target point and a corresponding size parameter s. For example, facet 300A operates so that light from common source point 330 is reflected to target point 310A. The shape of this facet 300A is an ellipsoid (or degenerates into a paraboloid in cases where the target is at infinity). An ellipsoid has the property that every ray leaving one focus will be directed to the other focus. In this example, the ellipsoid defining facet 300A has one focus at source point 330 and the other focus at target point 310A. Every facet 300A-I is an ellipsoid with one focus at source point 330 and the other focus at one of the target points 310A-I. However, the two foci are not sufficient to define an ellipsoid. There is a family of ellipsoids through foci 330 and 310A. A size parameter s determines which ellipsoid in the family is selected for the facet design.

Figure 4A:
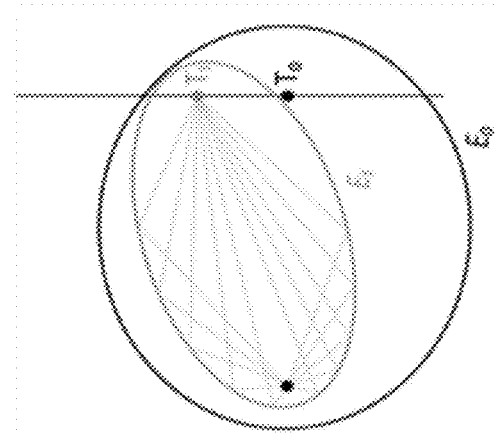
FIGS. 4A-C illustrates how scaling the size of an ellipsoid affects the amount of light directed to a corresponding target point.
Figure 4B:
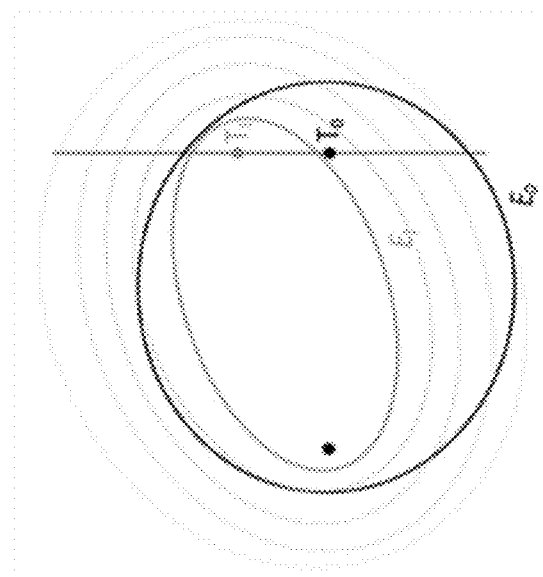
Figure 4C:
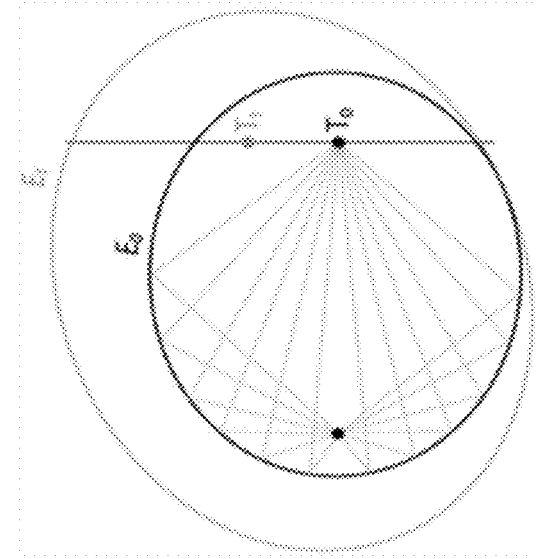

FIG. 4 illustrates how scaling the size of an ellipsoid $E_1$ affects the amount of flux at a corresponding target point $T_1$. In FIG. 4, ellipsoid $E_0$ directs light to target point $T_0$ and is held at a fixed size for all figures. Ellipsoid $E_1$ directs light to target point $T_1$ and varies in size between the figures. In FIG. 4A, ellipsoid $E_1$ is large, so ellipsoid $E_0$ collects all the flux and target point $T_0$ receives all the light. In FIG. 4C, ellipsoid $E_1$ is small, so ellipsoid $E_1$ collects all the flux and target point $T_1$ receives all the light. FIG. 4B shows different sizes of ellipsoid $E_1$, ranging from the large size in FIG. 4A to the small size of FIG. 4C. At some point in between these two extremes, the ellipsoid $E_1$ will be a size that allows $E_1$ to direct the desired amount of light to the target point $T_1$. Thus, the amount of light directed to each target point depends on the area of each facet.

Figure 5:
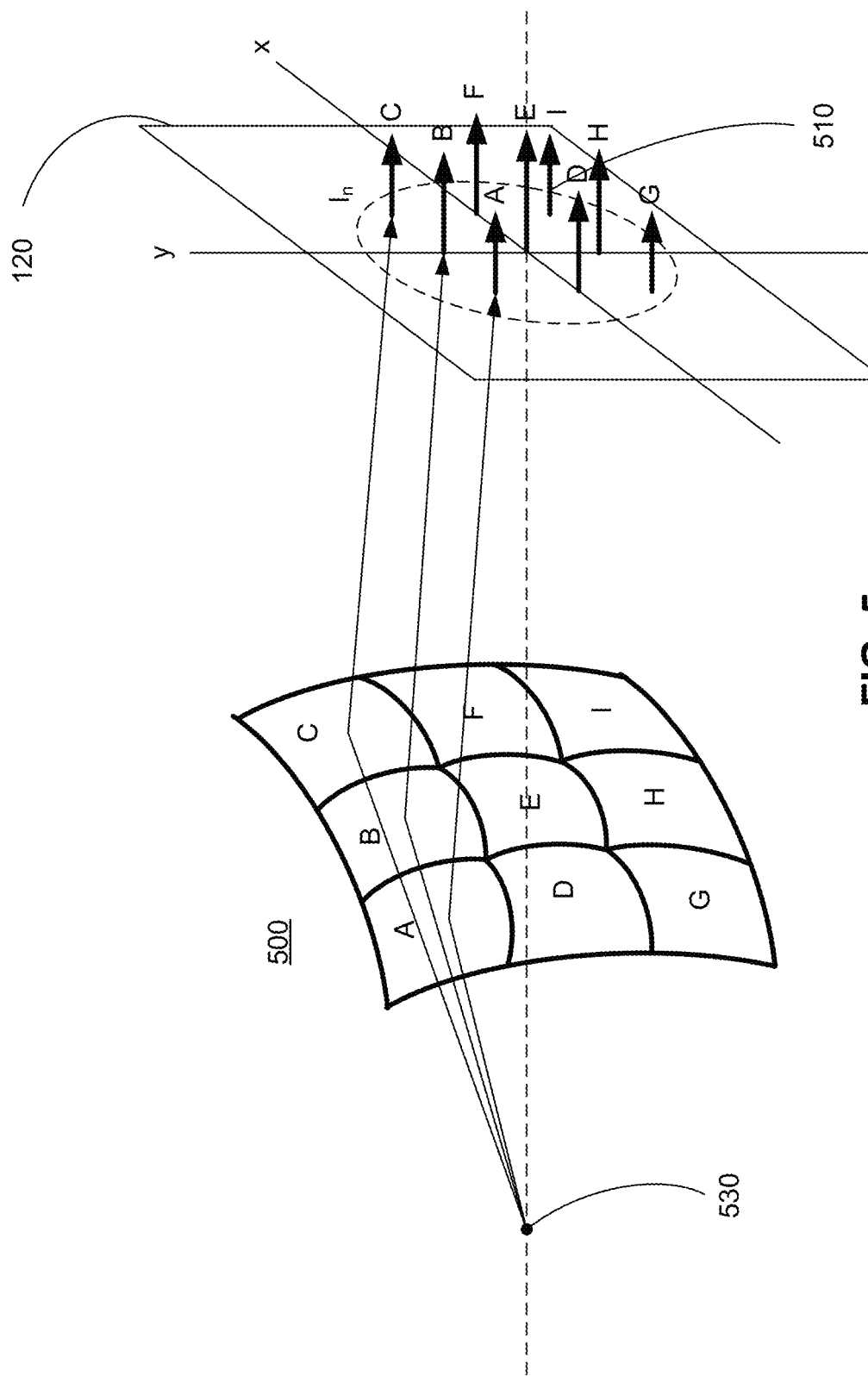
FIG. 5 illustrates a faceted refractive element and a corresponding 3×3 discrete target distribution, according to an embodiment.

FIG. 5 illustrates a refractive design. For refractive designs, each facet 500A-I is also defined by the common source point 530, the target point 510A-I for that facet and a size parameter. However, for refractive designs, the facets are typically Cartesian ovals rather than ellipsoids. By scaling the size of Cartesian ovals relative to each other, the amount of flux collected by each facet can be adjusted.

Returning to FIG. 3 and the reflective example, the two foci and size parameter for each facet defines the ellipsoid for each facet. However, the boundaries between facets are not expressly known. For example, FIG. 6A illustrates a reflector design 300 with nine facets 300A-I, and its corresponding discrete target distribution 310. Each facet 300A-I has a corresponding target point 310A-I. In this example, the top left facet 300A corresponds to the top left target point 310A. However, the boundaries between facets (and, in fact, which facets neighbor which other facets) are not expressly known. It cannot be assumed that facet 300E will border facets 300B,D,F,H just because target point 310E is adjacent to target points 310B,D,F,H.

FIG. 6B is a diagram showing facets 300A-I and their boundaries. In one approach, the boundaries are determined based on locating the vertices that define the boundaries. In improving 210 the optical design, the optical design system first determines 215 vertices for each facet so that facet boundaries may be determined 220.

In one approach, this is achieved by making use of the fact that each vertex (vertices a-f in FIG. 6B) is defined by the intersection of three ellipsoids. For example, vertex a is the intersection of facets (ellipsoids) 300E,A,B; vertex b is the intersection of facets 300E,B,F; and so on. So if we knew which facets bordered facet 300E, then we could determine the vertices of the boundary by calculating the intersections of ellipsoid 300E with two neighboring ellipsoids. Alternatively, to determine the boundary of facet 300E, we can calculate various intersections of ellipsoid 300E with two other ellipsoids and then keep those vertices which are actually on the boundary (or throw out those vertices which are not on the boundary).

In general, three ellipsoids with a shared focus point will intersect at two points. One of the intersection points typically can be disregarded as not an actual vertex of a facet. For example, the intersection point farther away from the common source point may be discarded. Intersection points can also be discarded for other reasons, for example if they are occluded by closer or further facets (depending on the geometry). Intersection points that establish boundaries for a particular facet will be referred to as supporting.

In the refractive case, three Cartesian ovals define an intersection point. The intersection point is where the optical path length from the common source point to each the three target points is the same. The optical design workstation can solve this equation, for example using Newton's method. Some solutions may correspond to non-physical intersection points (e.g., corresponding to rays undergoing total internal reflection).

Returning to the reflective example, one way to determine the supporting intersection points for a facet (i.e., the vertices) is to consider all possible 3-ellipsoid combinations involving that facet. Another way is to consider subsets of 3-ellipsoid combinations. Referring to FIG. 6A, the 3-ellipsoid combination 300E,A,B is more likely to produce a supporting intersection point than is the 3-ellipsoid combination 300E,A,I.

Now consider the four target points 310E,D,A,B and their corresponding facets. There are four possible 3-ellipsoid combinations among these four facets: 300E,D,A; 300D,A,B; 300A,B,E; 300B,E,D. Of these, 300A,B,E and 300E,D,A are supporting. The intersection of ellipsoids 300A,B,E produces vertex a of FIG. 6B, and the intersection of ellipsoids 300E,D,A produces vertex f. The intersections of ellipsoids 300D,A,B and 300B,E,D do not produce vertices. A similar approach can be taken for the other four target point combinations around target point E: 310E,B,C,F; 310E,F,I,H; and 310E,H,G,D.

This yields the list of vertices shown in FIG. 6C. Vertex a is defined by the intersection of facet E with neighboring facets A and B, vertex b is defined by the intersection of facet E with neighboring facets B and F, and so on. Note that adjacent vertices are defined by facet E, one shared neighboring facet (e.g., facet B for vertices a and b), and two other neighboring facets that are different (e.g., facet A for vertex a, and facet F for vertex b). The boundary can be verified by confirming this. In FIG. 6C, the boundary can be traversed as shown by the lines identifying the neighboring facet that is shared between adjacent vertices. For example, the topmost diagonal line identifies that facet B is used for both vertices a and b. The line from bottom vertex f to top vertex a also identifies that facet A is used for both vertices f and a.

Note that vertex e is a degenerate case where four ellipsoids D,E,H,G intersect at the vertex. This can be handled in different ways. In one approach, the degenerate case is detected and handled differently than 3-ellipsoid intersections in order to account for the four ellipsoids. In another approach, the vertex can be modeled as if facets E and G were not touching (separated by an infinitesimally short diagonal. In that case, there would be two vertices e1,e2 defined by facets D,E,H and H,G,D. That is the approach reflected in FIG. 6C, where vertex e1 (formed by facets D,E,H) is part of the boundary for facet E. Of course, the vertex could also be modeled as if facets D and H were not touching. In that case, there would be two vertices e1,e2 defined by facets G,D,E and E,H,G. This would still yield a boundary for facet E, but vertex e in FIG. 6C would be replaced vertices e1=H,G,E and e2=G,D,E. Doing so produces a boundary that can still be verified as described above.

FIG. 7 shows a more complex boundary. FIG. 7A shows a grid of target points 710A-Y. Each target point 710A-Y has a corresponding facet 700A-Y. Consider the design shown in FIG. 7B. In this case, the boundaries have moved so that facet 700M's neighbors are not limited to the facets for the eight adjacent target points 710G,H,I,L,N,Q,R,S. The neighboring facets additionally include facets 710J,V, and facet 710Q has been squeezed out and no longer neighbors facet 710M.

Figure 7A:
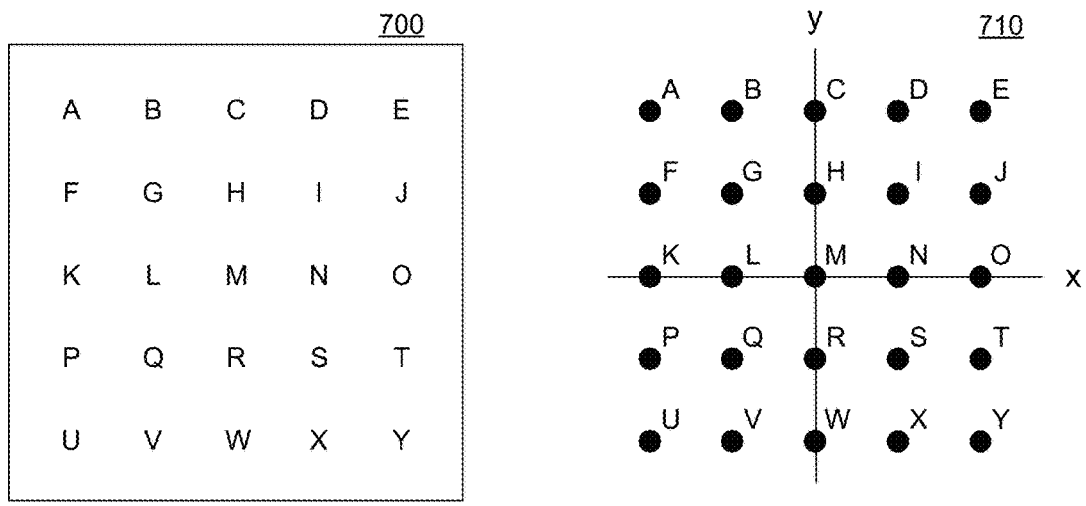
FIGS. 7A-D illustrate determining a boundary for a faceted reflector, according to an embodiment.
Figure 7B:
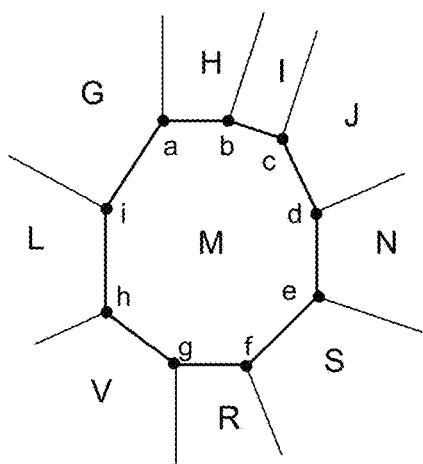
Figure 7C:
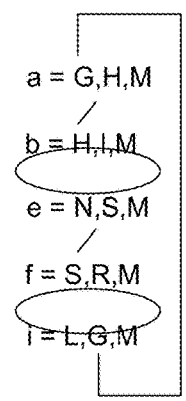
Figure 7D:
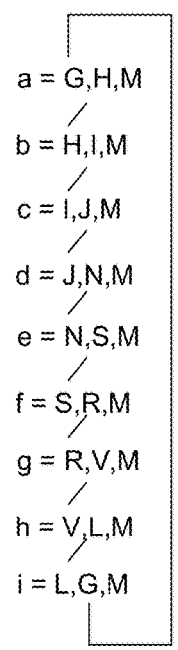

Considering 3-ellipsoid combinations based only on the eight adjacent points 710G,H,I,L,N,Q,R,S yields the vertex list in FIG. 7C. However, the boundary is not verified because there are two gaps in the sequence of neighboring facets, as denoted by the ovals. As a result, further 3-ellipsoid combinations are considered, especially those in the vicinity of the gaps I-N and R-L. Consider the gap I-N, which is the top oval. The vertex after vertex b is defined by the intersection of facets I,M and a third facet, but not N or H because those have already been tested. Given the location of target points in FIG. 7A, more likely candidates are facets C,D,E,J,O although other facets are also possible. Identifying the missing vertices yields the complete boundary shown in FIG. 7D.

The optical design system determines 220 facet boundaries using the determined vertex points. The optical design system connects the vertex points to create a facet boundary. If this is an intermediate design (e.g., if process 200 has already gone through at least one iteration), vertices may have already been established for one or more of the facets. Accordingly, it may only be necessary to perform steps 215 and 220 on one or more facets, and not on all of the facets.

In some embodiments, the process of determining vertices and boundaries depends on the arrangement of target points and facets. In FIG. 7A, target point 710M is adjacent to target points 710G,H,I,L,N,Q,R,S so the corresponding facets 700G,H,I,L,N,Q,R,S are first considered when determining vertices for facet 700M. The correspondence between target points and facets will depend on the geometry.

FIGS. 8A-D show four different types of reflective geometries and the correspondence between target points and facets. The top part of each figure is a perspective view and the bottom part is a cross-section view of the geometry. In each cross-section view, facets A-D are mapped to corresponding target points A-D.

The examples given above are for interior facets, i.e., facets that have boundaries only with other facets. For facets that are on the edge of the optical element, some of their boundaries (and vertices for the boundary) may be determined by the edge of the optical element rather than by neighboring facets. Referring to FIG. 6B, facet A has two interior vertices a,f, which are determined entirely by intersections with neighboring facets. However, facet A also has three other vertices that are determined in part by the edge of the optical element. The lower left vertex is determined by facets A,D and the left edge of the optical element; the top left vertex is determined by facet A and the left and top edges; and the top right vertex is determined by facets A,B and the top edge.

In one approach, the edges are also modeled as ellipsoids (or Cartesian ovals in the typical refractive case). As with interior vertices, the layout of target points does not guarantee which facets will be edge facets. Referring to FIG. 7A, it may be possible for facets G,H,I,L,M,N,Q,R,S to be edge facets, particularly as their shapes change during optimization. In addition, whereas three facets will produce one vertex, a combination of facets and edges may produce more than one vertex.

Returning to FIG. 2, the optical design system estimates 225 the lighted collected by the facets. In some embodiments this is done for all of the facets. For example, early in the design process, flux collected by each of the facets may be estimated. However, as the design gets closer to its final configuration, it may only be necessary to compute flux values for only selected facets. The amount of light collected for a particular facet is a function of the facet's and the neighboring facets' size parameters. Changes in the size parameter for a facet cause corresponding changes in the facet's area, and hence the flux collected by that facet. When one facet changes in size, the neighboring facets will also change in size so their collected fluxes will also change. Note, however, that so long as the outside border of the faceted optical element does not change, the total flux collected by all of the facets in the aggregate also does not change. Rather, changing the sizes of facets just redistributes the total flux between the facets. Because each facet is bounded, the optical design system is able to calculate how much light is collected by each facet.

Determining flux in this manner is much faster than, for example, traditional Monte Carlo flux estimation methods. Computation times using Monte Carlo flux estimation methods generally follow $RN^2$, where R is the number of rays/facet, and N is the number of facets. In contrast, the computation times using the methods described herein generally follow $4N$. This results in a significant savings in terms of computation time (i.e., a linear dependence instead of a quadratic dependence on the number of target points).

The optical design system then determines 230 whether the current faceted design meets a target condition. The target condition may be, for example, that the difference between the calculated light distribution and the discrete target distribution for the N-facet design is below a threshold value. That is, the current faceted design is close enough to the discrete target distribution. In one approach, the target condition is based on the difference between the flux collected by a facet and the flux desired at the corresponding target point.

In an ideal system with a perfect design, these two would be the same. However, other factors may be accounted for in a more realistic simulation. For example, there may be Fresnel losses at a refractive surface or less than 100% reflection at a reflective surface, so the desired target flux may be adjusted to compensate. In one approach, the optical design system begins with simplifying assumptions, such as no Fresnel losses, and finds a design solution. Then, higher order effects are added and the design is further optimized. In some cases, for example when an extended source is simplified to a source point, removing the simplifying assumptions may cause the centroid of the location of the light that hits a facet to deviate from the target location. In these cases, one approach is to adjust both the location of the target point and also the desired relative flux of the target point.

If the target condition is not met, the optical design system adjusts 235 one or more facet sizes. In some embodiments, adjusting one or more facet sizes is based on flux sensitivity values associated with one or more of the facets. A flux sensitivity value is a measure of the change in flux for a particular facet (e.g., dflux/dconic or dflux/dOPL) and its neighbors as the size of the facet is perturbed. The optical design system adjusts the areas of one or more facets to adjust the light distribution at the target points closer to values of the discrete target distribution that is desired.

The amount of adjustment for a given facet can be determined by the difference in the calculated light distribution compared to the desired distribution. Adjusting areas of the facets may be done by adjusting size parameters of the facets based on the estimated fluxes compared to the discrete target distribution. The process then repeats with step 215.

In some embodiments a damped least squares algorithm is used to adjust the facets. This is especially effective because the number of size parameters is equal to the number of target points, so there is a single unique solution for a given design. Cases where damped least squares does not converge are rare.

In some embodiments, once the calculated light distribution meets 230 the target criteria for an N-facet design, the optical design system then determines 240 whether a resolution criteria has been met. The resolution criteria determines whether the number of facets is sufficient to produce a light distribution that is close enough to the specified light distribution. In some embodiments, the resolution criteria may be met if the reflector contains at least a certain number of facets (e.g., 25×25 facets).

Alternatively, in some embodiments, the resolution criteria are met when the difference between a simulated light distribution at the target and the specified target distribution is less than some threshold value (e.g., no more than 1% variation). In these embodiments, the optical design system may convert the faceted design into a continuous surface, estimate the light distribution produced by the continuous surface and then compare this estimated light distribution to the specified light distribution. The resolution is sufficient 240 if the difference between the simulated target distribution and the specified light distribution is less than a threshold value.

If the resolution criteria are met, the optical design system may convert the faceted design to a final form, for example computing a corresponding continuous surface from the facets (if it has not already done so).

If the resolution criteria are not met 240, the optical design system increases 245 the number of facets in the optical design and then repeats the process for the design with more facets. In some embodiments, the target points are arranged in a J×K rectangular grid so that the number of facets $N_1$=JK, where J and K are the number of target points along each direction. The optical design system increases the sampling along each direction by a sampling factor $\alpha$>1, so that the grid is now $\alpha J \times \alpha K$ with an increased number of facets $N_2 = \alpha^2 N_1$. For example, if the resolution is 3×3 and $\alpha$=2, the optical design system increases the number of facets to 6×6. It is sometimes useful to have an odd number of samples so that the central sample is on-axis. In that case, the number of samples may increase by slightly less than 2 along each direction, for example progressing from 7×7 to 13×13 to 25×25. In other cases, the sampling factor may be different along each direction (e.g., if the target area has a high aspect ratio) and it could even be less than one in certain cases.

In step 205, if the optical design system is increasing the resolution, then the higher resolution faceted optical design may be created in a different manner since an existing lower resolution faceted optical design already exists. FIG. 2A is a flow diagram showing one approach. In this approach, the optical design system constructs 206 a source-target mapping based on the $N_1$ facet design (i.e., the lower resolution design). It then resamples 207 this mapping at $N_2$ sample points, corresponding to the $N_2$ facets in the higher resolution design. The higher resolution design is created 208 based on the resample points from the source-target mapping.

Figure 9A:
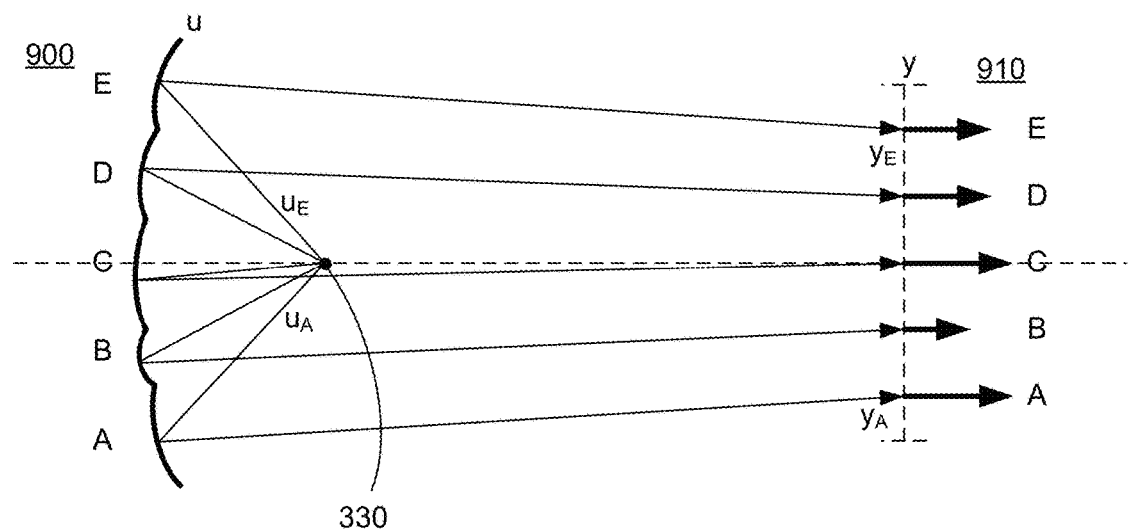
FIGS. 9A-E illustrate source-target mapping and resampling, according to an embodiment.

FIGS. 9A-E illustrates this process for transitioning from a 5×5 faceted design to a 9×9 faceted design. For clarity, only one dimensional is shown. FIG. 9A shows the 5×5 design. The design contains facets 900A-E, which direct light from source point 330 to corresponding target points 910A-E. Each facet 900A-E is defined by the source point, the corresponding target point and a size parameter. The size parameters have been adjusted (i.e., the boundaries between neighboring facets have been adjusted) to match the desired discrete target distribution 910. For this example, the source angle is parameterized according to variable u, which ranges from u=0 at the bottom of facet A to u=1 at the top of facet E. The target is parameterized by variable y, which ranges from y=0 at the bottom of the target area to y=1 at the top of the target area. The top and bottom of the target area are marked in FIG. 9A.

Figure 9B:
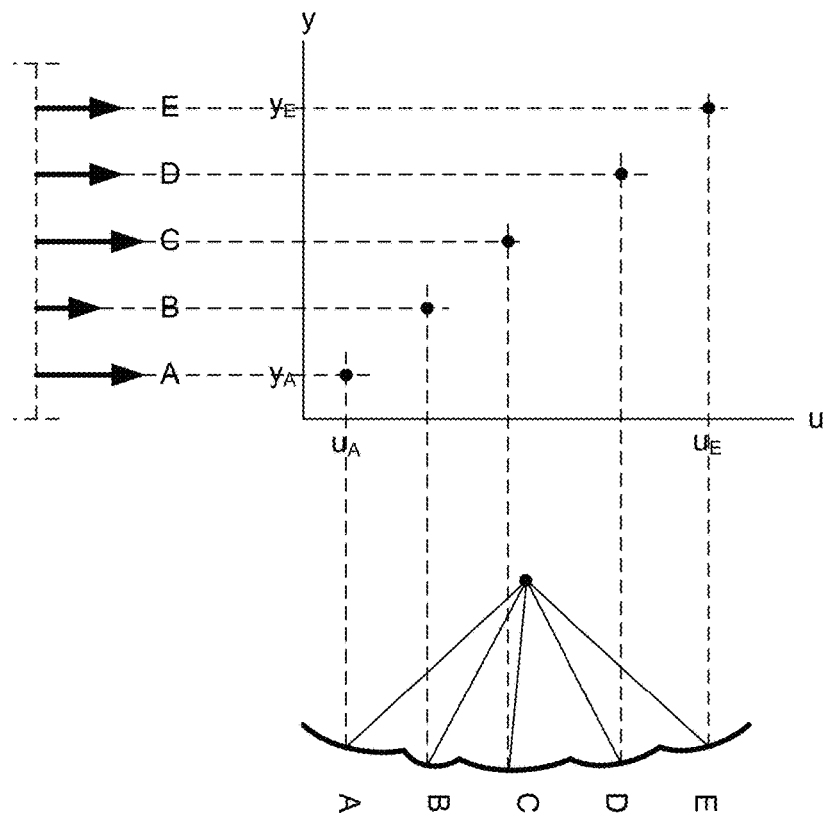

The rays drawn in FIG. 9A are rays to the centroid of each facet. The source coordinates for these rays will be denoted as $u_A, u_B, \ldots$ and the corresponding target coordinates as $y_A, y_B, \ldots$. Note that $y_A, y_B, \ldots$ are the locations of the target points. FIG. 9B shows a source-target mapping. In this example, source coordinates u are mapped directly against target coordinates y. $(u_A, y_A)$ are one source-target pair, $(u_B, y_B)$ are another source-target pair, and so on. These pairs are shown as solid dots in FIG. 9B. In alternate approaches, the source-target mapping may be implemented using intermediate steps. For example, the source coordinate u could be mapped against cumulative flux, the target coordinate y could also be mapped against cumulative flux, and then the source-target mapping can be implemented by using the two mappings against cumulative flux.

Figure 9C:
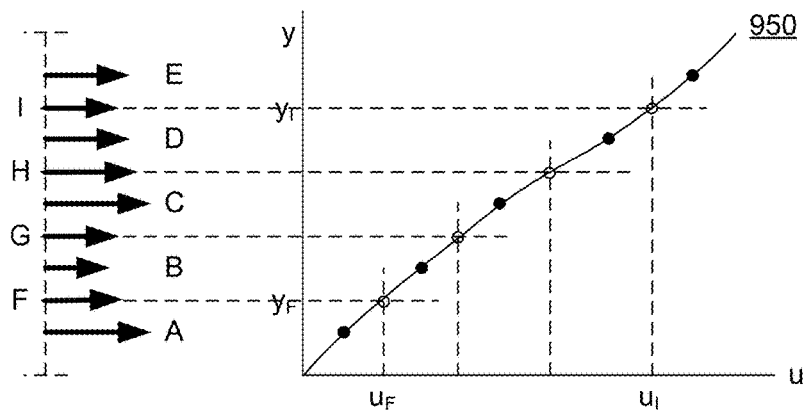

In FIG. 9C, the five target points are extended to nine target points by adding four additional target points F-H. The corresponding values of u are determined based on interpolating the source-target mapping 950. For example, the interpolation may be implemented using splines. In this example, the original five target points 910A-E were re-used in the 9×9 design, but that is not required. Entirely new target points could have been selected instead. The new target points $y_F, y_G, \ldots$ are mapped to source coordinates $u_F, u_G, \ldots$. These source coordinates $u_F, u_G, \ldots$ represent the "center" of each new facet.

Figure 9D:
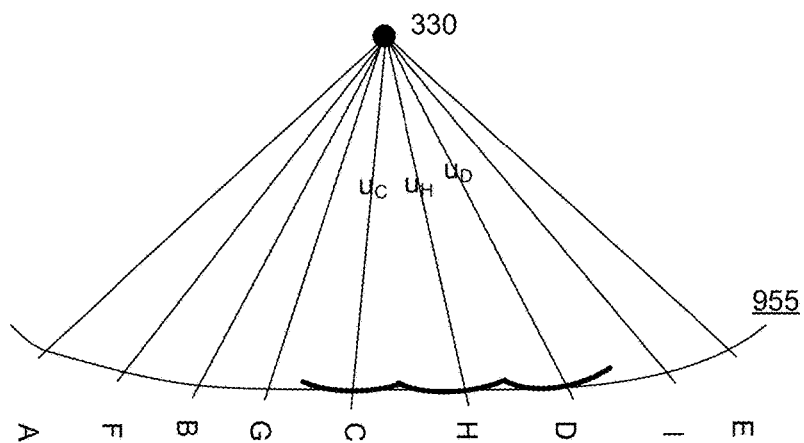
Figure 9E:
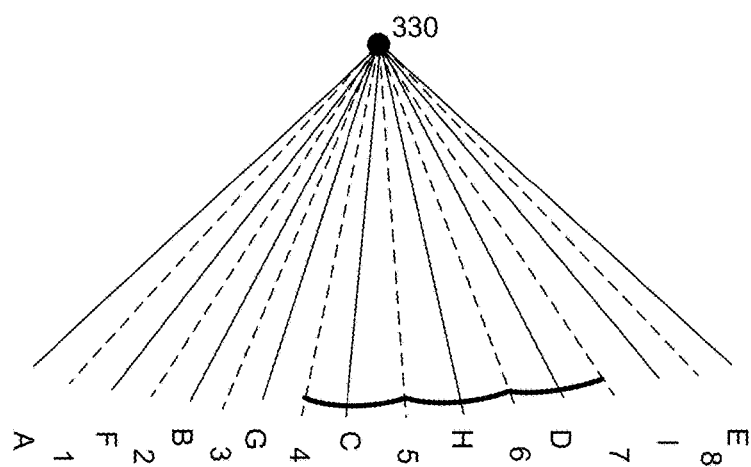

Once the common source point and 9×9 target points are selected, the remaining step to defining the facets is to select the size parameters for each facet. This is done using the "centers" estimated in FIG. 9C. FIG. 9D shows one approach to do this. FIG. 9E shows another approach.

FIG. 9D is a magnified view of the source point 330 and the centerlines defined by $u_A, u_B, \ldots u_I$. These lines are all shown as solid in FIG. 9D. These lines represent the "centers" of the facets. A continuous surface 955 is constructed based on the source-target mapping. The intersection of this continuous surface with each of the centerlines $u_X$ defines one point on that facet. For example, facet C will go through the intersection of centerline $u_C$ with continuous surface 955, adjacent facet H will go through the intersection of centerline $u_X$ with continuous surface 955, and so on. This is sufficient information to define the size parameter for each ellipsoid. For clarity, FIG. 9D shows only facets 900C,H,D. Note that the size parameter of each facet is determined independently of the other facets, and the boundaries are then defined by where the facets intersect. Also note that facets that exist in both the 9×9 design (FIG. 9D) and 5×5 design (FIG. 9A) may have different size parameters in the two designs. That is, facet 900D have a different size parameter in FIGS. 9A and 9D.

FIG. 9E takes a different approach. FIG. 9E is a magnified view of the source point 330 and the centerlines defined by $u_A, u_B, \ldots u_I$. These lines are all shown as solid in FIG. 9E. These lines represent the "centers" of the facets. Boundaries 1-8 between facets can then be chosen, with the boundaries located between the centers. These boundaries are shown as dashed lines in FIG. 9E. In one approach, the boundaries are chosen as halfway between the centers. For example, boundary 5 is halfway between centers C and H.

The facets are then sized based on the selected boundaries. This process may begin with center facet C. Facet C is defined by the common source point, its target point and its size may be determined by other external requirements, such as overall size or position of the reflector relative to the source. Maybe the apex of facet C is required to be at a certain location. In any event, the shape of facet C is fixed by these design choices and the facet extends from boundary 4 to 5. The adjacent facet H is then determined by the common source point, its target point, and facet H is sized to form the boundary 5 with facet C. This is repeated for H's neighbor facet D, and so on to construct the entire 9×9 faceted design.

Regardless of which approach is used, the resulting 9×9 design does not have to exactly match the desired discrete target distribution. Rather, it is preferable for the design to be well-behaved (e.g., no fully occluded facets) and then the design can be further optimized to match the discrete target distribution.

FIG. 10 is a high-level block diagram illustrating an embodiment of an optical design system 1000. The optical design system 1000 is a computing device that executes computer program modules which allow a user to perform computer aided design for optical devices. Specifically, the optical design system 1000 is configured to create reflector and/or refractive element optical designs to produce a specified light distribution within a target area. Some embodiments of the optical design system 1000 have different modules than those described here. Similarly, the functions can be distributed among the modules in a different manner than is described here. The optical design system 1000 is comprised of modules including an optical design store 1005, a user interface 1010, a mapping module 1020, a facet generator module 1030, a facet boundary module 1040, a flux estimation module 1050, a facet adjustment module 1060, a resolution module 1070, a compensation module 1080, and a high contrast module 1090. In alternate embodiments, one or more components of the optical design system 1000 may be implemented on separate devices rather than on a single system, and a network (e.g., the Internet, but may be any network, including but not limited to a Local Area Network (LAN), a Metropolitan Area Network (MAN), a Wide Area Network (WAN), a mobile wired or wireless network, a private network, or a virtual private network) may provide communications between these components.

The optical design store 1005 is a database that stores one or more optical designs, including those that can be possibly used as starting points for the design of various optical systems. The optical design(s) can be for one or more optical systems. For example, the optical design store 1005 could store multiple design iterations for a particular optical system and/or designs for many different optical systems.

The user interface 1010 is configured to interact with a user of the optical design system 1000. The user interface 1010 is configured to receive inputs (e.g., specifications). Additionally, the use interface 1010 is configured to present optical design data to the user. Optical design data is data associated with the optical design being simulated. Optical design data can include, for example, specifications (including specified source and specified light distribution), the optical design and components of the optical design, analysis of the optical design and its performance, etc. The user interface 1010 may be a text interface, a graphical user interface, or some combination thereof. In some embodiments, the user interface 1010 is configured to open, store, edit, or some combination thereof, one or more optical designs in the optical design store 1005 responsive to input from the user.

The user interface 1010 is configured to receive one or more specifications and/or initial conditions (such as a starting point design). The specification and initial conditions may be, for example, provided by a user of the optical system 1000, part of an optical design file, received from a third party, or some combination thereof. These inputs can include, for example, source characteristics, target characteristics, facet characteristics, or some combination thereof.

Source characteristics describe the optical source to be used in the optical design. Source characteristics can include, for example, source angular distribution (e.g., Lambertian or isotropic), source aim shape (e.g., on-axis circular, tangent plane rectangle, cosine space rectangle, etc.), and distance to target.

Target characteristics describe the target area and the desired illumination at the target. Target characteristics can include, for example, the specified light distribution, target size, target reflectance, target distribution (uniform, impulse, chirp, Gaussian, etc.), target grid, target sampling, sampling factor, target light distribution minimum intensity value, target light distribution maximum intensity value, and target dynamic range.

The target sampling is the sampling of the specified light distribution to form a discrete target distribution. In some embodiments, the target sampling may be uniform, e.g., a sample every 1 mm in a grid pattern. In some embodiments, the target sampling may be non-uniform. For example, a non-uniform sampling may be useful where the target illumination distribution is highly asymmetric.

Facet characteristics describe some conditions of the optical design specific to the facets. Facet characteristics can include, for example, facet resolution (e.g., specified by array layout J×K, or by size of each facet, or by total number of facets), a design type (i.e., reflector, refractive element, or some combination thereof), and ray light geometry (e.g., crossing diverging, non-crossing diverging, crossing converging, non-crossing converging).

Referring back to FIG. 10, the mapping module 1020 is configured to estimate a source-target mapping, for example as described previously in FIGS. 8-9. In one embodiment, the mapping module 1020 is configured to determine a source angular distribution composed of a plurality of source angles. Additionally, the mapping module 1020 is configured to determine a target location associated with each of the source angles. The mapping module 1020 creates a source-target mapping using the source angle distribution and the target locations.

The facet generator module 1030 is configured to create a faceted optical design. In some cases, this is accomplished using the source-target mapping, as was described in FIGS. 8-9. In some embodiments, where the design is for a reflector and there is a small number of facets, the classic Oliker algorithm can be used to find a set of supporting conics.

The facet boundary module 1040 is configured to determine the boundaries of facets, for example as described in FIGS. 5-7. The optical design system 1000 typically determines vertices using different methods, depending on whether the design is for a reflector or a refractive element. In embodiments, where the design is a reflector, the facet boundary module 1040 can use a process based on intersections of three ellipsoids with a common focus. In embodiments, where the design is a refractive element, three Cartesian ovals are used instead of ellipsoids.

The facet boundary module 1040 is configured to determine facet boundaries using the supporting vertices. The boundaries between supporting vertices are approximately linear. Accordingly, the facet boundary module 1040 bounds each facet by connecting the supporting vertex points for that facet. Note, that each of the facets is described by its own facet parameters. Facet parameters are parameters that describe the shape of the focusing facet. Facet parameters can include, for example, focus location, semi-major axis, semi-minor axis, ellipticity, index of refraction, etc. Facet parameters may be extrapolated from the size parameter and the location of the foci.

The flux estimation module 1050 is configured to estimate flux for some or all of the facets. Because each facet is bounded, the optical design system is able to calculate how much flux is collected by each facet. For example, as each facet is bounded, it can be calculated which source angles are incident on each facet, and hence the flux collected for each facet.

The facet adjustment module 1060 is configured to determine whether a current design meets a target condition, such as whether it is close enough to a desired discrete target distribution. If the target condition is met, the facet adjustment module 1060 is configured to provide data associated with the optical design to the resolution module 1070.

If the target condition is not met, the facet adjustment module 1060 is configured to adjust the sizes of one or more facets. In some embodiments, the facet adjustment module 1060 is configured to determine a flux sensitivity value for a portion of the plurality of the focusing facets using one or more of the flux collection values. As discussed above, once the flux sensitivity values are calculated, the facet adjustment module 1060 can adjust the sizes of one or more facets such that the flux at the corresponding target point is closer to that described by the specified light distribution. In one embodiment, the flux adjustment module 1060 uses damped least squares.

The resolution module 1070 is configured to determine whether a resolution condition is met. If the resolution condition is met, the resolution module 1070 might convert the faceted design into a continuous surface.

If the resolution criteria is not met, the resolution module 1070 is configured to increase the number of facets in the optical design. For example, the number of facets may be increased by a sampling factor $\alpha$ along each direction. The optical design system 1000 may automatically and/or adaptively set $\alpha$, or in some embodiments $\alpha$ may be set by a user (e.g., as part of the initial conditions). The resolution module 1070 is configured to re-sample the source-target mapping in accordance with the new number of facets. As discussed above in FIGS. 8-9, in one approach, the optical design system parameterizes the data in the source-target mapping and then interpolates to determine a re-sampled source-target mapping. The resolution module 1070 is configured to pass the re-sampled source-target mapping to other modules, e.g., the facet generation module 1030.

The compensation module 1080 is configured to perform iterative illuminance compensation. Iterative illuminance compensation can be used when differences between the specified light distribution, $E_{desired}$, and the simulated target illumination distribution, $E_{simulated}$, are small. In one embodiment, the compensation module 1080 is configured to perform iterative illuminance compensation using:

$$E_{tailored}(x, y)\big|_{n+1} = \left[\frac{E_{desired}(x, y)}{E_{simulated}(x, y)}\right]\bigg|_n E_{tailored}(x, y)\big|_n \quad (1)$$

where n is an integer, and $E_{tailored}$ is the tailored target illumination.

Each iteration using Equation 1 can also include an adjustment to the location of the target points. Examples where this may be useful include extended sources, decentered sources, and systems with additional optics (e.g., a dome over the source or a cover plate for the reflector). One way to automate the adjustment of the target points is by computing the centroid of the rays for each facet and comparing this to the facet's target point. If there is a difference, then the facet's target point is nominally adjusted by the opposite amount. For example, if the target point is at (0,0) but the centroid is at (0.2,0.3), then the updated target point would be at (−0.2,−0.3). In some cases, especially with an extended source, it may be impossible to achieve a specified light distribution, for example creating a sharp transition at the edge of a target. In such cases, use of a target where the edges have a transition can be more effective. The width of the transition can be adjusted during the iterative illuminance compensation.

The multi-pass design module 1090 is configured to provide design iterations that utilize FIG. 2 multiple times. For example, if the specified light distribution is not continuous (e.g., a plurality of abrupt changes in illuminance), then it may be difficult to directly achieve the specified light distribution using only one pass through FIG. 2. In these cases, the multi-pass design module 1090 is configured to replace a specified light distribution with an intermediate-continuous target illumination distribution, and the optical design system 1000 then calculates a light shaping element based on the intermediate target illumination distribution. The multi-pass design module 1090 then, using the light shaping element as a starting point, might adjust the target illumination distribution to the specified light distribution with a low dynamic range (e.g., minimum intensity value is ½ of the maximum intensity value), and the optical design system 100 determines a new light shaping element based on the adjusted specified light distribution. The multi-pass design module 1090 is configured to iteratively perform this process with multiple passes through FIG. 2, each time increasing the dynamic range of the adjusted specified light distribution until the desired specified light distribution at an acceptable dynamic range is achieved.

As another example, the specified source may be an extended source and the multi-pass design module 1090 is configured to perform multiple passes through process 200 to account for the differences between the specified extended source and the point source used in process 200. This may be referred to as iterative illuminance compensation.

Figure 11:
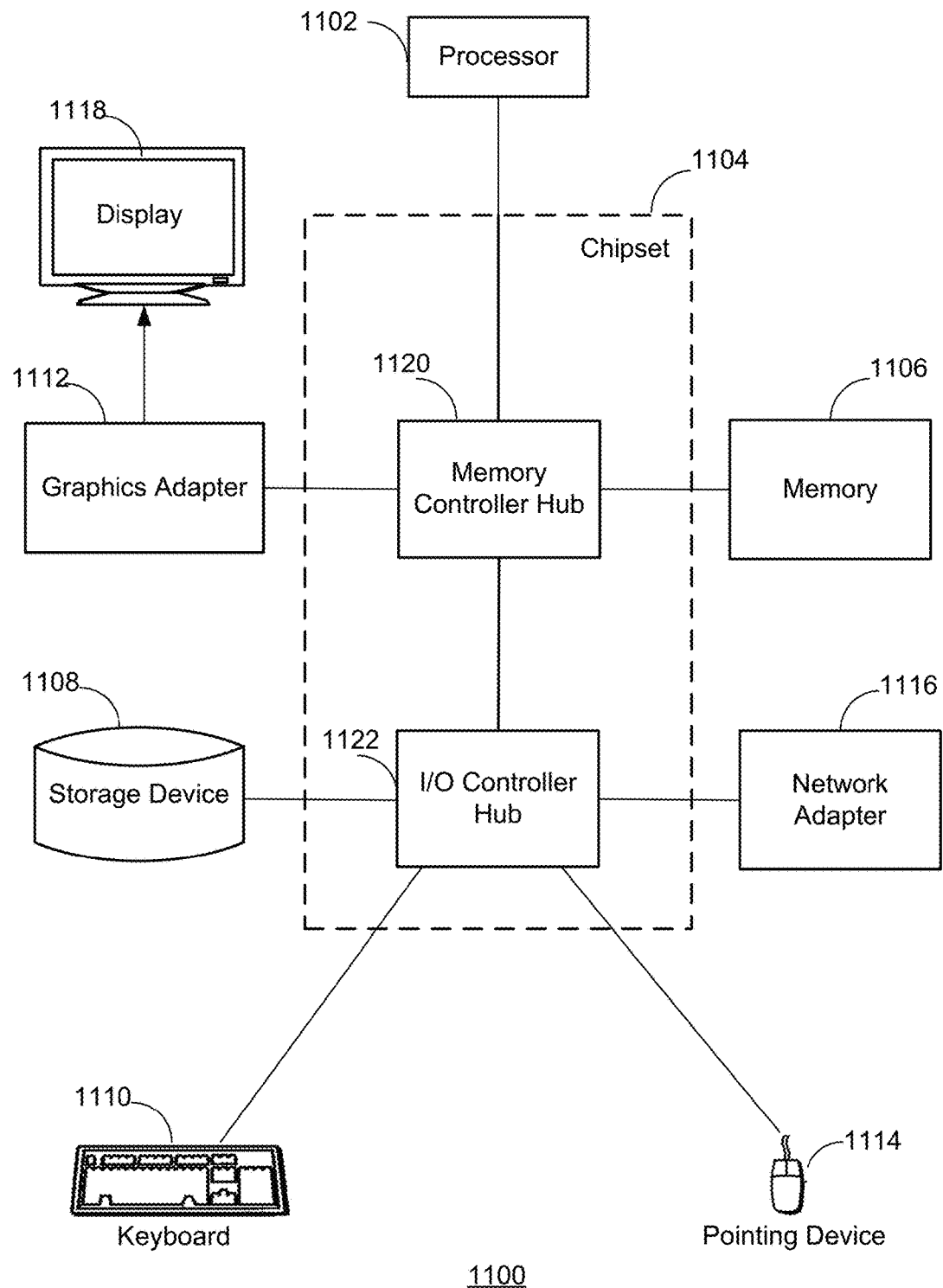
FIG. 11 is a high-level block diagram illustrating an example computer for implementing the optical design system show in FIG. 10.

FIG. 11 is a high-level block diagram illustrating an example computer 1100 for implementing the optical design system 1000 shown in FIG. 10. The computer 1100 includes at least one processor 1102 coupled to a chipset 1104. The chipset 1104 includes a memory controller hub 1120 and an input/output (I/O) controller hub 1122. A memory 1106 and a graphics adapter 1112 are coupled to the memory controller hub 1120, and a display 1118 is coupled to the graphics adapter 1112. A storage device 1108, keyboard 1110, pointing device 1111, and network adapter 1116 are coupled to the I/O controller hub 1122. Other embodiments of the computer 1100 have different architectures.

The storage device 1108 is a non-transitory computer-readable storage medium such as a hard drive, compact disk read-only memory (CD-ROM), DVD, or a solid-state memory device. The memory 1106 holds instructions and data used by the processor 1102. The pointing device 1111 is a mouse, track ball, or other type of pointing device, and is used in combination with the keyboard 1110 to input data into the computer 1100. The graphics adapter 1112 displays images and other information on the display 1118. The network adapter 1116 couples the computer 1100 to one or more computer networks.

The computer 1100 is adapted to execute computer program modules for providing functionality described herein.

In one embodiment, program modules are stored on the storage device 1108, loaded into the memory 1106, and executed by the processor 1102.

The types of computers 1100 used by the optical design system 1000 of FIG. 10 can vary depending upon the embodiment and the processing power required by the optical design system 100. For example, the optical design system 100 can run in a single computer 1100 or multiple computers 1100 communicating with each other through a network such as in a server farm. In some embodiments, the computers 1100 can lack some of the components described above, such as keyboards 1110, graphics adapters 1112, and displays 1118.

FIG. 12A illustrates a faceted optical design 1210 composed of a 7×7 array of facets. This design yields the light distribution 1220. In this example, the specified light distribution is uniform. Distribution would be all white if it matched the desired distribution. In 1220, gray represents midrange values, and black represents zero light. It is clear from the simulated light distribution 1220 that optical surface 1210 is not sufficient to obtain the uniform specified distribution.

The optical design system 1000 executes the process 200 to obtain a faceted surface of greater resolution. FIG. 12B illustrates an intermediate faceted optical design 1230 with a 13×13 array of facets. It produces the corresponding simulated light distribution 1240. This is improved compared to distribution 1220. FIG. 12C illustrates a 25×25 faceted surface and corresponding simulated light distribution 1260. Here, the simulated light distribution 1260 is much closer to the uniform specified light distribution.

Additional Configuration Considerations

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof. In one embodiment, a software module is implemented with a computer program product comprising a non-transitory computer-readable medium containing computer program code, which can be executed by a computer processor for performing any or all of the steps, operations, or processes described.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for generating a design state overview. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

The invention claimed is:

1. An optical design system for designing a light shaping element that directs light from a specified source to a specified light distribution, the optical design system comprising a computer system that executes computer program code contained on a non-transitory computer-readable storage medium, the computer program code comprising:
   a facet generation module that creates a first faceted optical design having $N_1$ facets, each facet directing light from a common source point to a target point for that facet, the common source point based on the specified source and the $N_1$ target points based on the specified light distribution;
   a facet boundary module that determines boundaries of the $N_1$ facets for the first faceted optical design;
   a flux estimation module that estimates flux intercepted by the $N_1$ facets based on the determined boundaries of the facets; and
   a facet adjustment module that adjusts the areas of two or more of the $N_1$ facets based on the estimated fluxes and the specified light distribution.

2. The optical design system of claim 1 wherein the target points are a sampling of the specified light distribution.

3. The optical design system of claim 2 wherein the sampling is a non-uniform sampling of the specified light distribution.

4. The optical design system of claim 2 wherein the facet adjustment module adjusts the areas of the facets based on a comparison of the estimated fluxes with a discrete target distribution, the discrete target distribution based on distributing light among the target points according to the specified light distribution.

5. The optical design system of claim 1 wherein each facet is defined in part by a size parameter, and the facet adjustment module adjusts the areas of the facets by adjusting the size parameters of the facets.

6. The optical design system of claim 1, wherein the facet adjustment module uses a damped least squares algorithm to adjust the areas of the facets.

7. The optical design system of claim 1 wherein the computer program code further comprises:
   a mapping module that estimates a source-target mapping based on the distribution of light among the $N_1$ target points; and a resolution module that resamples the source-target mapping at $N_2$ samples, $N_2 > N_1$;

wherein:

the facet generation module creates a second faceted optical design having $N_2$ facets, each facet directing light from the common source point to a target point for that facet, the $N_2$ target points based on the $N_2$ samples;

the facet boundary module determines boundaries of the $N_2$ facets for the second faceted optical design;

the flux estimation module estimates flux intercepted by the $N_2$ facets based on the determined boundaries of the facets; and the facet adjustment module adjusts the areas of two or more of the $N_2$ facets based on the estimated fluxes and the specified light distribution.

8. The optical design system of claim 1 wherein the optical design system is capable of designing both reflective light shaping elements and refractive light shaping elements.

9. The optical design system of claim 1 wherein the first faceted optical design is a reflective faceted optical design.

10. The optical design system of claim 9 wherein the facets are ellipsoid in shape.

11. The optical design system of claim 1 wherein the first faceted optical design is a refractive faceted optical design.

12. The optical design system of claim 11 wherein the facets are Cartesian ovals in shape.

13. The optical design system of claim 1 wherein the facet boundary module determines boundaries of the $N_1$ facets by:

determining vertices of the facets by determining the intersection point of the facets with two neighboring facets; and determining the boundaries of the facets based on the vertices.

14. The optical design system of claim 13 wherein determining the boundaries of the facets further comprises:

for each facet, verifying that adjacent vertices of the facet are intersection points defined by the facet, one shared neighboring facet, and two different neighboring facets.

15. The optical design system of claim 1 wherein the computer program code further comprises:

a compensation module that performs iterative illumination compensation.

16. The optical design system of claim 1 wherein the computer program code further comprises:

a multi-pass design module that provides multiple design iterations for designing the light shaping element; each design iteration utilizing the facet boundary module, the flux estimation module and the facet adjustment module.

17. The optical design system of claim 1 wherein the light shaping element is a faceted light shaping element.

18. The optical design system of claim 1 wherein the light shaping element is a continuous light shaping element.

19. The optical design system of claim 18 wherein the computer program code further comprises:

a resolution module that determines whether a resolution condition is met and, if the resolution condition is met, then converting the faceted optical design to a continuous optical design.

20. A non-transitory computer-readable storage medium containing computer program code, which can be executed by a computer system for performing a method for designing a light shaping element that directs light from a specified source to a specified light distribution, the method comprising:

creating a first faceted optical design having $N_1$ facets, each facet directing light from a common source point to a target point for that facet, the common source point based on the specified source and the $N_1$ target points based on the specified light distribution;

determining boundaries of the $N_1$ facets for the first faceted optical design;

estimating flux intercepted by the $N_1$ facets based on the determined boundaries of the facets; and adjusting the areas of two or more of the $N_1$ facets based on the estimated fluxes and the specified light distribution.

* * * * *